Patented Sept. 5, 1939

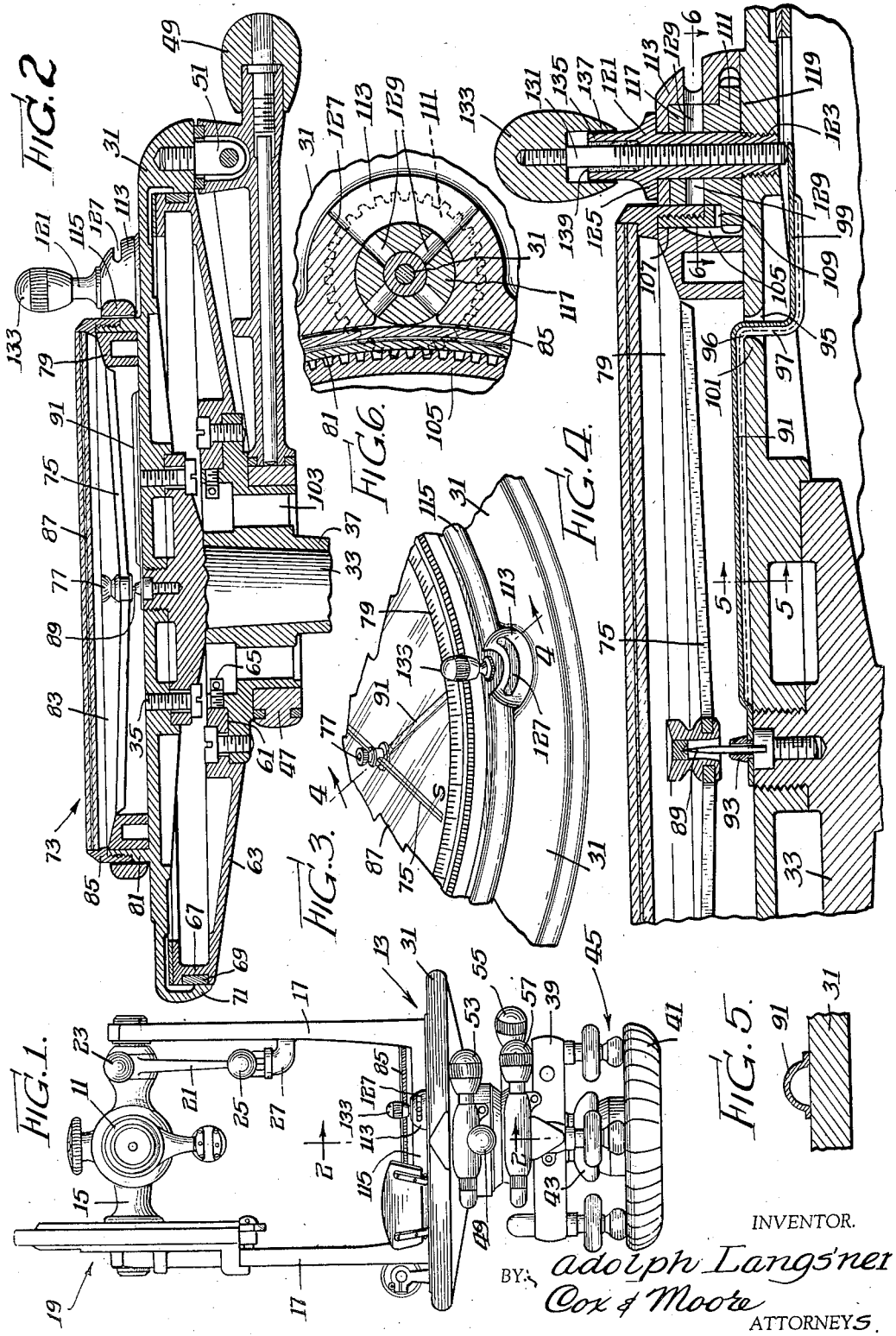

2,171,755

UNITED STATES PATENT OFFICE 2,171,755

ACTUATING MECHANISM

Adolph Langsner, Chicago, Ill., assignor to Eugene Dietzgen Co., Chicago, Ill., a corporation of Delaware Application March 14, 1938, Serial No. 195,847

10 Claims. (Cl. 33—222)

My invention relates in general to precision devices, more particularly, measuring and indicating istruments, and has special reference to indicating devices of the character forming a part of surveying instruments.

An important object of the invention is to provide an instrument having enclosed mechanism, including means for adjusting the mechanism from outside of the enclosure whereby to protect the same from deterioration as a result of exposure to foreign matter, such as dust and moisture.

Another important object is to provide adjusting means comprising elements forming a unit assembly and operable to perform a plurality of adjustments upon the enclosed mechanism.

Another important object is to provide a directional indicator, such as a compass, enclosed in a casing for the exclusion of foreign matter from the operating parts of the device, and including cooperatively associated means forming an assembly unit on the compass case and operable from outside of the case to accomplish a plurality of adjustments upon the enclosed parts, for example, the release of a pivoted indicator and the adjustment of an index scale.

Another important object is to provide adjusting means of the character mentioned, including a housing for the adjusting mechanism on the casing of the enclosed mechanism, the housing affording support for a pair of rotatable adjusting elements adapted for manipulation to accomplish the several adjustments of the mechanism within the casing; a further object being to arrange the adjusting elements compactly in concentric relationship within the housing; a further object being to provide a readily operable knob outwardly of the housing for adjusting one of the elements; and another object being to provide for relatively more difficult adjustment of the other element as by the insertion of a turning tool through an opening formed in the walls of said housing, while at the same time arranging the parts to exclude appreciable penetration of foreign matter through said opening and into the housing.

A still further object is to mount the adjusting elements for rotation, the one on and the other within a sleeve secured in the housing; a further object being to utilize the sleeve to anchor the housing and the adjusting elements therein upon the casing containing the mechanism to be adjusted.

A further object is to provide for driving connection of the adjusting elements with the mechanism of the instrument within the casing in a manner substantially excluding penetration of foreign matter to said mechanism.

Another important object is to provide a surveying instrument having adjustable mechanism of the character described, turnably supported in the instrument as on a compass plate forming the bottom of a casing containing the adjustable mechanism, wherein adjustment is accomplished by means of an element extending through an opening through the plate forming the bottom of said casing and including sealed means for enclosing the under side of the plate around said opening against penetration of foreign matter to and through said opening.

Another important object is to form the housing which encloses the manually-operable adjusting elements in sightly, streamlined fashion, and to provide for manipulation of at least one of the adjusting elements by means of a knob of substantially teardrop configuration to conform with the appearance of the housing; a further object being to arrange the knob for cooperation with an extension of the housing whereby to minimize penetration of foreign matter into the housing along the actuating stem to which the knob is connected.

Another important object is to provide a combination pointer lift and ring shifter for compasses comprising a carrying sleeve, a pointer lifting stem threaded through the sleeve, and a ring turning gear journalled on the sleeve concentrically with respect to the stem, the same forming an extremely neat, compact, simple, useful and efficient assembly for the required adjustments.

Numerous other objects, advantages and inherent functions of the invention will become apparent as the same is more fully understood from the following description, which, taken in connection with the accompanying drawing, discloses a preferred embodiment of the invention.

Referring to the drawing,

Figure 1 is an elevation, in perspective, of a surveying instrument, namely, a transit, fitted with a compass and adjusting means embodying my present invention;

Figure 2 is a sectional view taken substantially along the line 2—2 in Figure 1;

Figure 3 is a fragmentary, perspective view of the adjusting means and a part of the compass with which it is associated in the illustrated embodiment;

Figure 4 is an enlarged sectional view taken substantially along the line 4—4 in Figure 3;

Figure 5 is a sectional view, still further enlarged, taken substantially along the line 5—5 in Figure 4; and Figure 6 is a sectional view taken substantially along the line 6—6 in Figure 4.

To illustrate my invention, I have shown on the drawing a precision measuring instrument, namely, a transit, adapted for use in surveying, although it will be obvious that the features of the invention are not restricted to transits.

The illustrated instrument, however, comprises a telescope 11 tiltably supported in a mounting frame 13 as by means of the support axle 15, the frame 13 comprising a pair of spaced uprights 17 by and between which the telescope and its supporting axle extend. The axle and one of the spaced supports 17 carry cooperating scale means 19 for indicating the tilted position of the telescope, which may be precisely adjusted by means of the tangent clamp 21 carried on and adapted to be clamped on the axle by means of the manually operable clamp-controlling knob 23. The clamp 21 also has tangent adjusting means controlled by the knob 25 and operatively associated with a bracket 27 carried on one of the uprights 17 for the accurate adjustment of the angle of inclination of the telescope in its mounting frame.

The mounting frame 13 comprises a plate 31 which carries the supports 17 in spaced relationship thereon, and this plate 31 in turn is carried on a spindle 33 secured on the plate in any suitable or convenient fashion, as by means of the fastening screws 35, the spindle 33 extending downwardly of the lower surface of the plate 35 in axial alignment with the center thereof. The spindle 33 is rotatably mounted in a support frame comprising a sleeve journal 37 which in turn is journalled in a bearing forming a part of a leveling frame 39. The leveling frame in turn is supported adjustably on a base plate 41 by means of a preferably socketed bearing 43 and a plurality of leveling screws 45 disposed in spaced relationship around the bearing 43.

Provision is made for turning and securing the spindle in a desired angular relationship with respect to the leveling base 39. For this purpose the sleeve 37 is formed with a clamp seat upon which is fitted a clamp 47, including a manually operable knob 49 for securing the clamp upon the sleeve 37. The clamp also carries tangent adjusting means in position to cooperate with a pin 51 on the plate 31 and having an adjusting knob 53 to accurately turn the plate and the spindle with respect to the sleeve after the clamp 47 has been secured thereon.

The sleeve 37 also is freely turnable in the journal provided by the leveling plate 39, and an additional clamp may be provided having a portion adapted to be secured upon a suitable seat formed on the sleeve 37 by manipulation of the knob 55. This additional clamp may have tangent adjusting means 57 cooperatively associated with a pin carried in an extension 59 on the leveling plate, the pin being similar to the pin 51.

My present invention is not necessarily restricted to the particular form or arrangement of the clamps or the tangent adjusting means, and the operable portions of the tangent adjusting means may equally well be located on the frames 31 and 39 with the cooperating pins corresponding to the pins 51 fixed on the clamp elements.

I do not herein claim the details of the clamp since the same form the subject-matter of my co-pending application, Serial No. 202,426, filed the 16th day of April, 1938.

The frame comprising the journal 37, however, may be formed in its upper portions with an annular seat 61 for receiving the central portions of an annular cover plate member 63, radially extending adjusting screws 65 being arranged adjacent said seat for accurately centering the cover plate member 63 with respect to the sleeve 37.

The marginal portions of the cover plate member 63 are flanged and peripherally grooved, as at 67, to receive a packing 69 in position to press upon a downwardly-turned, annular portion forming a rim 71 at the edge of the plate 31. This rim 71 is preferably smoothly finished to slidingly receive the packing 69 which thus seals the annular opening between the cooperating edges of the plates 31 and 63, thus preventing the entrance of foreign matter between the edges of the plates and keeping the under side of the plate 31 within the rim 71 substantially free of dirt and moisture.

In the illustrated embodiment, a compass 73 is mounted on and carried by the plate 31. This compass comprises an indicator or pointer element 75 preferably comprising a metallic strip extending oppositely from a bearing 77, and an annular compass element comprising an index ring 79 suitably graduated to indicate the deflection of the pointer.

The pointer element 75 and the ring element 79 are housed within a casing, the bottom of which preferably comprises the central portions of the plate 31. The plate 31 is formed with an upstanding annular wall 81 which forms the sides of a compass case, the inner surfaces of the wall being smoothly finished to snugly receive the wall 79 which is preferably of inverted U-shaped sectional configuration, having the bottom of the ring beveled as at 83, to form an upwardly-facing, inclined, scale-carrying surface. The oppositely facing inner and outer surfaces of the ring 79 are preferably smoothly finished, the outer surface making a snug sliding fit within the annular wall 81, so that the opposed ends of the pointer 75 may swing closely adjacent the inner edge of the inclined, scale-carrying surface 83. The upper, outer surfaces of the wall 81 may be and preferably are threaded to receive an annular cover 85 which is fitted with a transparent pane 87 of material, such as glass, so that the pointer and scale ring 79 may be clearly viewed through this pane.

Means is provided for pivotally mounting the indicator 75 in its casing, such support means in the illustrated embodiment comprising a pintle 89 mounted preferably with its axis in alignment with the axis of the spindle 33 which carries the plate 31. This mounting may be conveniently effected by threading the pintle element in the upper end of the spindle which preferably has a portion threaded into and secured in a central opening formed in the plate 31, so that the upper end of the spindle 33 is exposed upwardly at the center of the plate 31 within the compass casing.

In an instrument of this character, it is desirable to provide means for lifting the indicator 75 from its carrying pintle when the instrument is not in use as a direction indicator. It is also necessary to provide for adjusting the scale ring 79 by turning the same within the compass casing, and I have provided improved means for accomplishing these adjustments from outside of the casing, without, however, opening the same or permitting access into the casing of moisture, dirt or other foreign matter that might have a deleterious effect upon the scale ring and pointer. To this end, I provide an indicator lifting lever 91 comprising a preferably metallic strip having preferably the sectional configuration illustrated in Figure 5 of the drawing, in the interests of rigidity, and having, also, an annular indicator-elevating portion 93 in position encircling the pintle 89, said portion 93 being adapted to remain in depressed position on the pintle, permitting the indicator to pivot thereon when the compass is in use, and to be projected upwardly with respect to the pintle to engage the indicator bearing 77 and raise the same from seating position on the pintle. To this end, the lever 91 extends from the indicator raising portion 93 radially outwardly along the bottom of the compass case, to an opening 95 in said bottom adjacent the inner surface of the ring 79, at which point the lever is bent, as at 96, to provide an offset portion 97 extending through the opening. This offset portion extends preferably below the under side of the plate 31 and has a bent end 99 extending below the plate and outwardly of the wall 81 of the compass casing. The bent portion of the lever 96, it will be seen, is pivotally supported by and on the shoulder 101 formed by the inner edge of the opening 95, so that by depressing the end 99 of the lever, the indicator raising portion 93 may be elevated within the compass casing. By releasing the end 99, the weight of the lever between the fulcrum portion 95 and the indicator lifting portion 93 will cause the lever to drop and rest upon the bottom of the compass casing.

The opening 95 is preferably made as small as possible, of a size merely sufficient to freely permit the assembly of the lever therein. It will be noted, however, that entrance of foreign matter through this opening is substantially prevented by the fact that the plate 63 encloses the under side of the plate 31, including the opening 95 and the portions of the lever which extend below the plate. Penetration of foreign matter into the enclosure is prevented by the gasket 69 which seals the peripheral edges of the plates 31 and 63, while penetration of foreign matter into said enclosure through the central opening of the plate 63 is prevented by adequate sealing means incorporated in the tangent adjusting clamps 47 and 50. If desired to increase the sealing effect, suitable packing may be placed in the weight-reducing openings 103 which, in the illustrated embodiment, are arranged in the clamp seat forming portion of the sleeve 37.

In order to adjustably turn the scale ring 79 within the compass casing, I form the outer periphery of the ring with rack teeth 105. The grooves defining these teeth extend only in the lower portions of the ring, the upper portions being substantially continuous, as shown at 107, and snugly engaging the inner surface of the compass casing 81. Opposite the rack teeth 105 the wall 81 of the compass casing is formed with an opening 109 adjacent the upper surface of the plate 31. This opening is of a size sufficient merely to accommodate driving means for said ring element 79, said driving means comprising, in the illustrated embodiment, a portion of the circumference of a gear 111 connected on a turnable driving element which is rotatably mounted outwardly of the wall 81. By turning the gear 111, its driving connection with the scale ring 79 may be utilized to adjustably turn the ring within the compass casing.

While the opening 109 is merely sufficient to accommodate the ring driving means comprising a portion of the rim of the gear, I provide a housing 113 outwardly of the compass casing and cooperatively associated therewith to enclose the turnable driving element, of which the gear 111 comprises a part, and to form a substantially sealed closure preventing entrance of foreign matter into the compass casing through the opening 109. This housing is formed preferably integrally with an annular ring 115 which also is preferably integrally interconnected with the lower ends of the upright instrument support 17. This ring is of a size to snugly embrace the wall 81 and may be anchored in any suitable fashion on the plate 31 in order to secure the uprights 17, as well as the housing 113, in place on the plate 31. The ring 115, when applied in position, locates the housing 113 opposite the opening 109, the housing having edges snugly engaging the outer surfaces of the wall 81, nevertheless, allowing for the application of the cover 85 upon the threaded portions of the wall 81.

The housing provides a preferably cylindrical chamber in which is rotatably received and supported the turnable driving element including the gear 111 and an extension 117 extending within the housing above the gear 111 which preferably rests upon a finished seat 119 formed in the plate 31 outwardly of the wall 81 opposite the opening 109. The rotatable driving element, including the gear 111 and the extension 117, is preferably journalled within the housing on a bearing member 121 comprising a sleeve, the lower end of which is fastened in the plate 31 preferably by threading the same in place, as shown at 123.

The sleeve 121 extends through an opening in the top of the housing 113 and is preferably flanged, as at 125, so that the element 121 serves to tightly clamp the housing 113 upon the seat 119, thereby holding the gear 111 in place. The housing 117 in its walls opposite from the compass casing is preferably provided with a slot 127 opening upon the circumference of the cylindrical gear extension 117 which is provided with a plurality of radially extending openings or sockets 129 opposite the slot 127, so that, by inserting a turning instrument in the slot and into the sockets 113, the gear 119 may be turned upon the support 121, to thereby adjust the ring 79 within the compass casing.

It will be noted, however, that the extension 117 is snugly received within the housing portion that contains the slot 127, so that penetration of foreign matter through the casing 113 from the opening 127 to the slot 109 is substantially prevented by this snug fit. Likewise, penetration of foreign matter into the casing 113 through the top opening which receives the sleeve element 121 is prevented by the clamping contact of the flange 125 with the top of the casing at said opening.

The operating end of the lever 91 is disposed below the plate 31 immediately under the end of the sleeve that is secured in the plate, as at 123. The sleeve 121 provides a channel for receiving a stem 131 extending at one end outwardly of the sleeve above the housing 113 and carrying a handle or knob 133 to facilitate manipulation thereof.

The opposite end of the stem is arranged to project outwardly of the lower end of the sleeve below the plate 31 in position to operatively engage the operating end of the lever 91, so that, by shifting the stem 131 axially within the sleeve 121, the lever may be actuated in order to raise or lower the pointer 75 on the pivot 89.

I prefer to form the stem 131 for threaded engagement in the sleeve 121 so that the stem may be moved axially within the sleeve in response to a turning movement applied to the knob or head 133. The threaded connection moreover tends to prevent the entrance of dirt through the sleeve 121 and into the chamber below the plate 31 in which the operating end of the lever 91 extends.

It will be noted that this chamber is sealed at its edges by means of the gasket 69 in order to prevent the entrance of foreign matter into the chamber and thence into the compass casing through the lever opening 95.

As an additional means for excluding foreign matter from entering the chamber through the sleeve 121, the sleeve is provided with an upstanding collar 135 surrounding the stem at its point of emergence from the sleeve, and the knob 133 is formed with a dependent rim 137 adapted to snugly engage the outer surfaces of the collar 135; and a suitable felt packing 139 may be disposed within the collar 135 snugly about the stem 131, if desired.

It will be understood from the foregoing that I have provided a neat, compact, slightly and efficient adjusting mechanism for enclosed apparatus requiring adjustment. The mechanism not only combines means for accomplishing a plurality of adjustments in a single assembly, but insures against the accidental displacement of an accurately calibrated part, namely, the ring 79, by substantially entirely enclosing the adjusting element 117 and providing for the movement thereof only by the insertion of an adjusting tool through the slot 127. Thus, the adjustment of the element 79 may only me accomplished intentionally, thereby eliminating accidental displacement of the element from adjusted position. At the same time, the pointer conditioning control, which in no sense requires accurate manipulation, is accomplished by means of the readily accessible knob 133 so that the compass conditioning manipulation may be accomplished rapidly and with a minimum of effort.

The outer surfaces of the casing 133 also are provided with a substantially spherical configuration which is continued in the outer surfaces of the exposed portions of the sleeve 121 and also in the substantially tear-drop shape of the knob 133, thus providing an extremely attractive appearance.

It is thought that the invention and numerous of its attendant advantages will be understood from the foregoing description, and it is obvious that numerous changes may be made in the form, construction and arrangement of the several parts without departing from the spirit or scope of the invention, or sacrificing any of its attendant advantages, the form herein described being a preferred embodiment for the purpose of illustrating the invention.

The invention is hereby claimed as follows:

1. A surveying instrument comprising a frame, a support plate rotatable on and overlying said frame, means on said frame and cooperatively associated with said plate for enclosing a space beneath said plate to form a substantially sealed chamber, there being an opening in said plate communicating with said chamber, means forming a compass case on and extending above said plate, a pointer rotatably supported on a pivot within said case, a pointer controlling means extending through a hole in said plate between said compass case and said chamber, and having a pointer controlling portion within said compass case and an actuating portion extending through said hole to said sealed chamber, actuating means extending through said wall opening and drivingly associated with said actuating portion in said sealed chamber, said actuating means being operable outwardly of said chamber and case to move the pointer control portion in said case and dust-excluding means cooperatively associated with said actuating means at said wall opening to exclude entrance of foreign matter into said chamber through the opening.

2. A surveying instrument comprising a frame, a support plate rotatable on and overlying said frame, means on said frame and cooperatively associated with said plate for enclosing a space beneath said plate to form a substantially sealed chamber, means forming a compass case on and extending above said plate, a pointer rotatably supported on a pivot within said case, pointer control means having a pointer actuating portion extending within said case and cooperatively associated with said pointer to raise the same from its pivot and another portion extending within said sealed chamber and shiftable therein to move the pointer actuating means in said case, a sleeve on said plate and opening into said chamber adjacent the said portion of the pointer control means therein, said sleeve extending outwardly of said chamber, a stem axially shiftable in said sleeve and having portions in position to drivingly engage with the pointer control means to shift the same in said chamber and case and other portions extending outwardly of the free end of the sleeve and provided with manually operable means for shifting the stem in the sleeve for the actuation of the pointer control means, said manually operable means comprising a knob or head having an annular skirt formed for interfitting relationship with the free end of the sleeve to exclude foreign matter from entering the chamber through the sleeve.

3. A surveying instrument comprising a frame, a support plate rotatable on and overlying said frame, means on said frame and cooperatively associated with said plate for enclosing a space beneath said plate to form a substantially sealed chamber, means forming a compass case on and extending above said plate, a pointer rotatably supported on a pivot within said case, pointer control means having a pointer actuating portion extending within said case and cooperatively associated with said pointer to raise the same from its pivot and another portion extending within said sealed chamber and shiftable therein to move the pointer actuating means in said case, a sleeve on said plate and opening into said chamber adjacent the said portion of the pointer control means therein, said sleeve extending outwardly of said chamber, a stem axially shiftable in said sleeve and having portions in position to drivingly engage with the pointer control means to shift the same in said chamber and case and other portions extending outwardly of the free end of the sleeve and provided with manually operable means for shifting the stem in the sleeve for the actuation of the pointer control means, said sleeve forming a journal, a rotatable element journalled on said sleeve outwardly of said compass case, means extending in an opening in said case and drivingly connecting said rotatable element with an adjustable compass element within the case, and a housing enclosing said rotatable element and sealing said case around the opening therein.

4. A surveying instrument as set forth in claim 3, wherein said housing comprises a shell having an open bottom adapted to seat on said plate adjacent the compass case and an open side adapted to abut the outer surfaces of the case around the opening therein, and wherein said sleeve is removably connected on said plate and is formed with a shoulder for clamping the housing in position to enclose the rotatable element and to seal the opening through which it is drivingly connected with the adjustable compass element.

5. A surveying instrument as set forth in claim 3, wherein said housing has a slot in the walls thereof opening upon the peripheral surfaces of said rotatable element, said element having peripherally opening sockets opposite said slot whereby the element may be turned by insertion of a turning implement through said slot.

6. Adjusting means for a turnable element enclosed in a case having a wall formed with an opening, comprising a housing secured in position engaging the outer side of said wall at said opening, a turnable driving element mounted within said housing, and means extending in said opening and drivingly connecting the driving element with the turnable element within said case, said housing having a slot in the walls thereof, and said turnable element having peripherally opening sockets for the reception of a turning instrument inserted through said slot, said housing having a cylindrical cavity, and said turnable adjusting element having cylindrical portions snugly fitting said cavity to seal the housing against penetration of foreign matter therethrough from said slot to the lateral opening of the case.

7. Adjusting means for a turnable element enclosed in a case having a wall formed with an opening, comprising a housing secured in position engaging the outer side of said wall at said opening, a sleeve extending through said housing and serving to anchor the housing in place, a turnable adjusting element journalled on said sleeve within said housing, and means extending in said opening and drivingly connecting the driving element with the turnable element within said case, means to turn said driving element on said sleeve from outwardly of said housing, and a stem axially movable in said sleeve, means drivingly connecting said stem with a shiftable element within said case, said stem having portions exposed outwardly of said housing for operating the stem to actuate said shiftable element.

8. Adjusting means comprising a sleeve, a stem axially movable in said sleeve, a driving element journalled on said sleeve in coaxial relationship with respect to said stem, means supported by said sleeve and forming a housing enclosing said driving element, and means to drivingly connect said stem and the driving element with separate devices requiring adjustment.

9. Adjusting means as set forth in claim 8, said housing having a slot and said driving element having peripherally opening sockets aligned with said slot for the reception of a turning tool whereby said driving element may be turned within the housing only intentionally and not accidentally, said stem having an end exposed outwardly of the housing and formed with a manually operable head, making adjustment thereof relatively easy compared with the adjustment of the driving element.

10. Adjusting means as set forth in claim 8, wherein the sleeve is fixed on a supporting base and is formed with means for securing the housing upon said base.

ADOLPH LANGSNER.